United States Patent

[11] 3,621,298

[72] Inventor Claude Rousseau
Joinville-le-Pont, France

[21] Appl. No. 859,711
[22] Filed Sept. 22, 1969
[45] Patented Nov. 16, 1971
[73] Assignee C.I.T.-Compagnie Industrielle Des Telecommunications
Paris, France
[32] Priority Sept. 20, 1968
[33] France
[31] 167087

[54] MONOSTABLE DEVICE HAVING A HIGH TIME CONSTANT WITH SHORTENED REUSE TIME
9 Claims, 2 Drawing Figs.

[52] U.S. Cl. 307/273, 307/279, 307/285, 328/207
[51] Int. Cl. H03k 3/284
[50] Field of Search 307/273, 276, 279, 285, 291; 328/207

[56] References Cited

UNITED STATES PATENTS

| | | | |
|---|---|---|---|
| 2,827,574 | 3/1958 | Schneider | 307/273 |
| 3,217,176 | 11/1965 | Chin | 307/273 X |
| 3,275,846 | 9/1966 | Bailey | 307/279 |
| 3,327,301 | 6/1947 | Reich | 307/279 |
| 3,350,576 | 10/1967 | Zimmerman | 307/273 X |
| 3,480,796 | 11/1969 | Polkington et al. | 307/279 X |

*Primary Examiner*—Donald D. Forrer
*Assistant Examiner*—R. C. Woodbridge
*Attorney*—Craig, Antonelli & Hill

ABSTRACT: The device comprises, on the one hand, a bistable device transistors which forms a bistable flip-flop, and, on the other hand, a device consisting of a capacitor and high time-constant transistors, the latter device comprising a field-effect transistor capable of introducing itself, on a first order, into one of the bridges of the bistable device to destroy the latter's symmetry, the bistable state thus created being liable to come to an end before exhaustion of the time-constant on a second order transmitted to the bistable device.

INVENTOR:
CLAUDE ROUSSEAU
BY: Craig, Antonelli & Hill
ATTORNEYS

INVENTOR:
CLAUDE ROUSSEAU

Craig, Antonelli & Hill
ATTORNEYS

MONOSTABLE DEVICE HAVING A HIGH TIME CONSTANT WITH SHORTENED REUSE TIME

The present invention relates to a monostable device having a high time constant, but the reuse time of which may be shortened as desired, for example as soon as the members to be actuated have been effectively operated.

Monostable circuits having a time constant are already known, but these circuits generally necessitate the presence of electrolytic capacitors when the time delay becomes higher than about 100 milliseconds. Now, electrolytic capacitors have a number of intrinsic defects, such as low reliability and considerable manufacturing tolerances, which render them incompatible with the production of constant and accurate timing circuits. In fact the problem which arises may be more clearly defined as follows: it is known that the charge or discharge time of a capacitor depends upon the RC product or time constant in which R is the resistance of the circuit and C the value of the capacitance. In order to change the time constant, therefore, it is possible to vary either the resistance R or the capacitance C. However, the use of conventional transistors in which the input impedance is low between the base and the emitter involves the use of a low-control resistance and consequently, if it is desired to increase the RC product it is necessary to increase the capacitance C and therefore to use electrolyte capacitors whose defects have just been mentioned.

The invention has for its object to raise the RC product by the use of a field effect transistor (F.E.T.) which affords a high-input impedance. Such a transistor is analogous to an unheated solid-state triode whose slope S is the quotient of the output current by the input voltage. The device according to the invention can give, for example a time delay of about 10 seconds in the unstable state.

The device according to the invention is distinguished notably in that it comprises a separate bistable circuit controlled by a separate time-constant circuit so as to form a monostable device having a considerable unstable period which can be shortened as desired.

In accordance with one feature of the invention, the bistable circuit controlled by the time-constant circuit consists of two conventional transistors arranged in the form of a bistable multivibrator in which two of the bridge resistors are replaced by Zener diodes, while the associated time-constant circuit comprises, in addition to a capacitor, at least one conventional transistor and one field-effect transistor, which is capable of being inserted by a first control into one of the bridges of the bistable-circuit in order to destroy the symmetry thereof, the unstable state thus created being capable of ending before the time constant has elapsed at a second control applied to the bistable circuit.

One feature of the invention is the use of Zener diodes for bridge resistors of the bistable circuit in such manner as to ensure a better turn off, while increasing the base current.

In accordance with one feature of the invention, the change of state of the field-effect transistor is obtained by means of a transistor provided between the charging circuit of the capacitor and the field-effect transistor.

In accordance with another feature of the invention, the time-constant circuit comprises a field-effect transistor inserted between two conventional transistors, the first being connected to a capacitor and the second being connected to the base of one of the transistors of the bistable multivibrator.

In accordance with another feature of the invention, one of the transistors of the multivibrator is kept nonconductive in the stable state by the time-constant circuit in the conductive state.

In accordance with a further feature of the invention, during the unstable period, the time-constant circuit being nonconductive, the capacitor discharges into a high resistance independently of the said circuit until the instant when the potential of a common point reaches a value such that the time-constant circuit becomes conductive again and controls the multivibrator of the two transistors in order to restore it to the stable state.

Further features of the invention will become apparent from the following detailed description and from the drawings, which are given as a nonlimiting example and in which.

Figure 1:
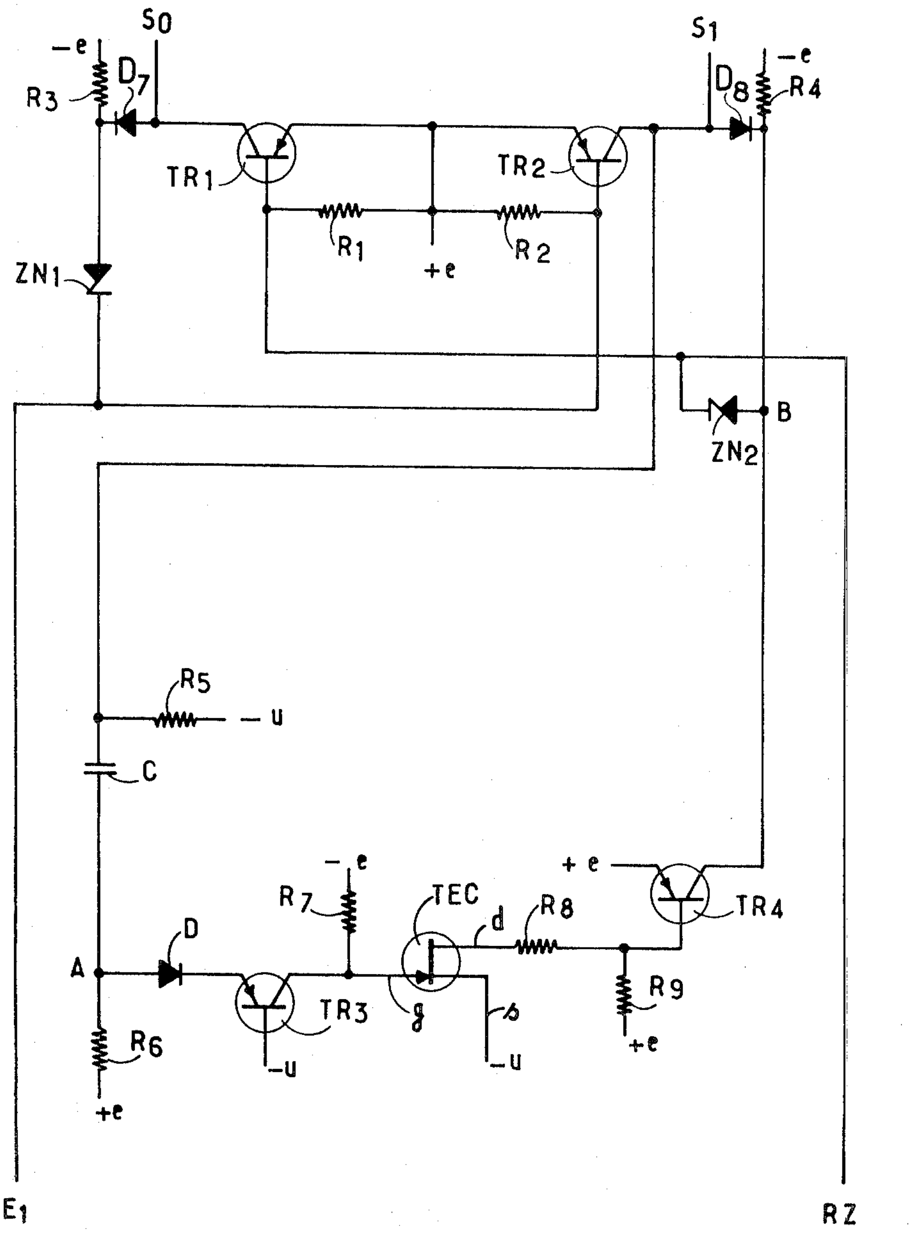
FIG. 1 shows the circuit diagram of a device according to the invention.

In the embodiment illustrated in FIG. 1, the bistable circuit is composed of two transistors TR1 and TR2 and the time-constant circuit is composed of two transistors TR3 and TR4 and of a field-effect transistor TEC. The whole device comprises two outputs $S_o$ and $S_1$; the output $S_o$ displays the state o and the output $S_1$ displays the state 1 in the stable period of the device. On the other hand, the output $S_o$ displaying the state 1 and the output $S_1$ displaying the state o characterize the unstable period of the device. The input $E_1$ to which a positive pulse is applied has the effect of changing the device from its stable state to its unstable state, which lasts until the time constant has elapsed. However, an immediate return to the stable state can be effected by a positive pulse applied to the wire RZ.

The device will now be described detail. The emitters of the transistors TR1 and TR2, which are both of the PNP type, are connected to a common point which is in turn connected on the one hand to a positive polarity $+e$ and on the other hand to the common point of two resistors R1 and R2, the other end of R1 being connected to the base of the transistor TR1 and the other end of R2 being connected to the base of the transistor TR2. The base of the transistor TR1 is also connected on the one hand to the wire RZ and on the other hand through a Zener diode ZN2 to the collector of the transistor TR4 and to a resistor R4. The base of the transistor TR2 is also connected on the one hand to the wire E1 and on the other hand through a Zener diode ZN1 to the collector of the transistor TR1. The anode of the Zener diode ZN1 is connected to the collector of the transistor TR1. The collector of the transistor TR1 is also connected to the output $S_o$ and on the other hand to the negative polarity $-e$ through a diode D7 and a resistor R3. The collector of the transistor TR2 is connected to the output $S_1$, to the negative polarity $-e$ through a decoupling diode D8 and a resistor R4, to one electrode of a capacitor C and to a certain negative potential $-u$, which is lower in absolute value than $e$, through a resistor R5. The other electrode of the capacitor C is connected on the one hand to the anode of a diode D and on the other hand to the positive polarity $+e$ through a resistor R6. The cathode of the diode D is connected to the emitter of the transistor TR3 of PNP-type. The base of this same transistor is connected to the negative potential $-u$, the absolute value of which is lower than that of $e$.

The collector of the transistor TR3 is connected on the one hand to the negative polarity $-e$ through a resistor R7 and on the other hand to the grid $g$ of the field-effect transistor TEC. It is known that the latter behaves as an unheated solid-state triode in which $d$, the drain, would be the anode and $s$, the source, would be the cathode. The drain $d$ of the transistor TEC is connected to a resistor R8 and the source $s$ of the transistor TEC is connected to the negative potential $-u$ already defined. The other end of the resistor R8 is connected on the one hard to the base of the transistor TR4 of PNP-type and on the other hand to the positive polarity $+e$ through a resistor R9. The emitter of the transistor TR4 is connected to the positive polarity $+e$. It has already been seen that the collector of the transistor TR4 is connected to the base of the transistor TR1 through the Zener diode ZN2 and to the negative polarity through the resistor R4, the Zener diode ZN2 having its anode connected to the collector of the transistor TR4.

The device according to the invention operates as follows:

STABLE STATE

The transistor TR3 is continuously conductive, the positive potential $+e$ of its emitter applied through the resistor R6 and the diode D being higher than that of its base, which is negative and equal to $-e$; its collector is thus brought to the potential $-u$, which is also the potential of the grid $g$ of the field-effect transistor TEC. The source $s$ of TEC being at the potential $-u$, no inverse voltage is set up at the "grid-source" diode, the transistor TEC is conductive and substantially the potential $-u$ is present at the drain $d$. On the other hand, the potential of the base of the transistor TR4 has an intermediate value between $-u$ and $+e$, depending upon the resistors R8 and R9. Since this potential is necessarily lower than the potential $+e$ of its emitter, the transistor TR4 is also conductive. The potential of the collector of the transistor TR4, which has a value close to $+e$, is also present at one of the electrodes of the Zener diode ZN2, the other electrode of which is connected to the polarity $+e$ through the resistor R1. The inverse current through the diode ZN2 and the resistor R1 therefore cannot be set up and the base of the transistor TR1 is thus biased at the same potential $+e$ as its emitter. The transistor TR1 is therefore nonconductive and the output $S_o$ takes the potential of the collector of TR1. This potential close to $-e$ is determined by the voltage drop across the resistor R3 due to the inverse current in the circuit: resistor R3, Zener diode ZN1 and resistor R2 in parallel with the resistance of the "base-emitter" junction of TR2. This inverse current gives at the base of TR2 a potential which is lower than the potential $+e$ of its emitter. The transistor TR2 is therefore conductive and the output $S_1$ is in the state 1, i.e. very substantially at the potential $+e$. The upper electrode of the capacitor C, which is connected to the collector of TR2, is therefore also very substantially at the potential $+e$; on the other hand, the lower electrode of the capacitor C is very substantially at the potential $u$, which is imparted thereto by the base of the transistor TR3 and the diode D. The capacitor C is therefore charged at the voltage $u$, ($u$ being lower in absolute value than $e$) and a certain current passes through the resistor R5.

UNSTABLE STATE

In order to change to the unstable state, a positive polarity $+e$ is momentarily applied to the input E1, which has the effect of rendering the transistor TR2 nonconductive, the base and the emitter then being at the same potential. The upper electrode of the capacitor C then takes the potential $-u$ through the resistor R5, which results in a displacement of the reference point which causes a potential $-2u$ to be set up at the lower electrode of the capacitor C. Consequently, the "-base-emitter" junction of the transistor TR3 in series with the diode D is inversely biased (the base potential being higher than the emitter potential), and consequently TR3 becomes nonconductive. The diode D has the object of limiting the inverse voltage across the terminals of the base-emitter junction of the transistor TR3. The capacitor C discharges into the resistor R6 and this state lasts as long as there remains at the electrode of C a potential lower than $-u$ and therefore between $-2u$ and $-u$. It is to be noted that the resistors R6 and R7 may be very high, because the field-effect transistor is "-voltage"-controlled and not current-controlled. The transistor TR3 being nonconductive, the potential $-u$ disappears from the grid $g$ of the field-effect transistor TEC and is replaced thereat by the potential $-e$ through the resistor R7, which has the effect of inversely biasing the "source-grid" junction at a sufficient voltage to reduce the drain to zero at the wire $d$. The field-effect transistor TEC becomes nonconductive and the transistor TR4, which then has its base at the same potential as its emitter, also becomes nonconductive. A current is thus established in the circuit consisting of R4, ZN2, and R1, which has the effect of establishing at the base of the transistor TR1 a potential lower than that ($+e$) of its emitter. The transistor TR1 becomes conductive; the output $S_o$ acquires a potential close to $+e$, and therefore the state 1. The base of the transistor TR2 acquires the potential $-e$ equal to that of its emitter and TR2 is confirmed in its nonconductive state; the output $S_1$ is at the negative potential $-u$ which is imparted thereto through the resistor R5.

Thus, the unstable state is well characterized by the output $S_o$ in the state 1 and by the output $S_1$ in the state $o$. This state is clearly unstable, since it depends, as has been stated, upon the discharge time of C. The resistor R6 may be given a very high value and may give rise to a high time constant, which does not have the effect of supplying during the stable state a control current as in the case of a conventional monostable multivibrator.

NORMAL RETURN TO THE STABLE STATE

When the potential of the lower electrode of the capacitor C reaches a potential higher than $-u$, the absolute value of which is therefore lower than the absolute value of $u$, the base-emitter junction of the transistor TR3 being forwardly biased, the transistor TR3 becomes conductive, which brings the transistors TEC and TR4 into the conductive state in the manner already described in the foregoing description of the stable state.

THe transistor TR1 becomes nonconductive and the transistor TR2 becomes conductive, the positive polarity applied to E1 obviously having disappeared after TR1 has become conductive in the unstable state. The output $S_0$ again displays the state $o$ and the output $S_1$ again displays the state 1, which clearly characterizes the stable state. The capacitor C is recharged by the following circuit: $+e$, transistor TR2, capacitor C, diode D, transistor TR3 and voltage $-u$ at the base of TR3.

ANTICIPATED RETURN TO THE STABLE STATE

The return to the stable state may also be effected by means of a positive polarity $+e$ applied to the wire RZ during the unstable period, the polarity at E1 having previously been suppressed. This polarity has the effect of producing an anticipated return to the stable state by rendering TR1 nonconductive. In this case, the capacitor C is not entirely discharged and the point A has not yet reached the point of potential higher than $-u$ which would enable TR3 to become conductive again. After the signal applied to the wire RZ and when TR2 has again become conductive, the capacitor C receiving the polarity $+e$ at its upper electrode applies a positive pulse to the discharge circuit consisting of the resistor R6 which has the effect of rendering TR3 conductive. The stable state already described is thus restored.

It is to be noted that the potential $-u$ with $/u/</e/$ may be taken from the same source as $e$, the positive polarity $+e$ being common to $-u$ and to $-e$. If the sources $u$ and $e$ are different, it is necessary for them to have a common positive pole.

It is also to be noted that the transistor TR3 is not strictly essential and that the lower electrode of the capacitor C (point A) could be directly connected to the grid $g$ of the field-effect transistor TEC. HOwever, the inverse potential difference to be applied to the terminals of the source-grid junction of TEC in order completely to cancel its drain current is not precise and often varies from one specimen to the other. Consequently, the end of the unstable period, which results in TEC becoming conductive again, may take place over too large a time range. In order to restore the precision essential in serial manufacture, the transistor TR3 has therefore been added; it has the object of detecting the instant when the potential of the lower electrode of the capacitor becomes at least equal to the potential of the base $-u$, that is to say, to the potential of the source of the field-effect transistor, the latter reaching saturation instantly and not following the downward variation of the potential of the lower electrode of the capacitor.

Figure 2:
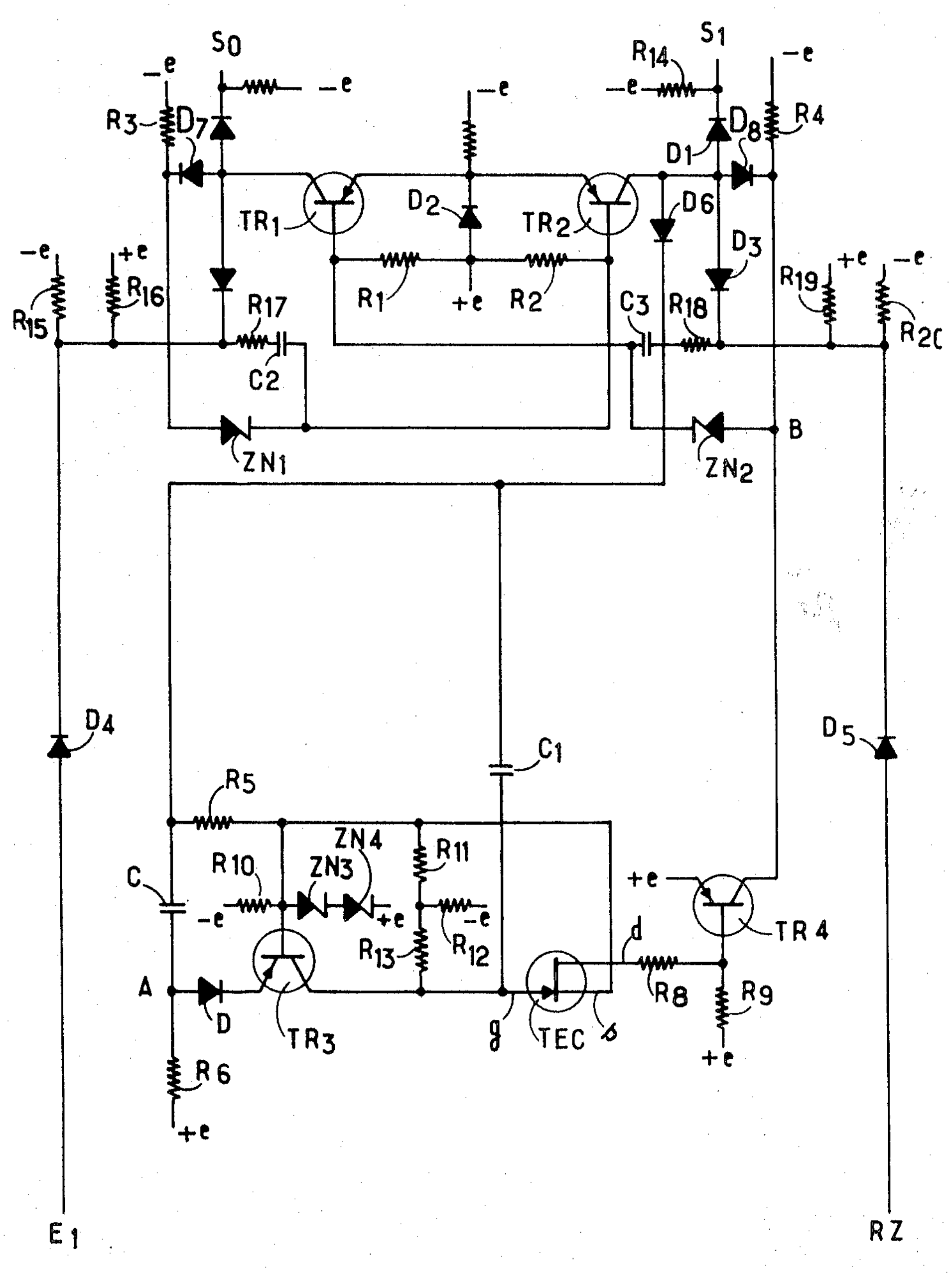
FIG. 2 illustrates an embodiment of the invention with various improvements as compared with FIG. 1.

FIG. 2 shows various practical improvements in the invention according to FIG. 1, but the principle of the invention remains the same. Therefore, like parts are denoted by the same references in FIG. 2 as in FIg. 1. The main additions are the following:

Since the field-effect transistors do not undergo inverse voltages higher than a certain value 2 $u$, a supply source $-u$

*has been provided which is connected to the base of the transistor TR3, while retaining only a general supply voltage* (−*e*, +*e*).

The voltage −*u* is provided by two series-connected Zener diodes ZN3 and ZN4, each of voltage *u*/2, in series with a resistor R10, the point common to the resistor R10 and to the diode ZN3 also being connected to the base of the transistor TR3. The negative polarity −*e* is connected to the other end of the resistor R10 and the positive polarity is connected to the cathode of the diode ZN4. Under these conditions, regardless of the variations of the base current, the potential of the base permanently remains at the potential −*u*. The arrangement comprising the Zener diodes ZN3 and ZN4 permits partial recharging of the capacitor C so as to obtain a more rapid charging and a shortened reuse time of the device. On the other hand, when the transistor TR3 is nonconductive, the potential −*u* disappears from the grid of TEC. The bridge consisting of the resistors R11, R12 and R13 is such that it inversely biases the "source-grid" junction at a sufficient voltage to zeroize the drain current. Consequently, the field-effect transistor TEC becomes nonconductive. Hence, the "source-grid" inverse voltage has been limited to a suitable value which does not involve any danger of destruction of the field-effect transistor.

A capacitor C1 is connected between the grid *g* of the transistor TEC and the collector of the transistor TR2 through a diode D6. The capacitor C1 permits of effecting a very rapid turnoff of the field-effect transistor TEC at a change from the stable state to the unstable state by means of the control E1. It has been seen that as soon as this control is applied the transistors TR2 and TR3 become nonconductive. However, the transistor TR3 in fact becomes slowly nonconductive, owing to the high value of the resistor R13. The upper electrode of the capacitor C1 was at the potential +*e* and its lower electrode at the potential −*u* during the stable state; as soon as TR2 becomes nonconductive, the upper electrode of C1 is connected to the polarity −*u* through the resistor R5; the current pulse which consequently passes through C1 has the effect of immediately rendering nonconductive TEC.

Capacitors C2 and C3 have the object of applying to the two transistors TR1 and TR2 control pulses which are more distinct than a simple change of potential and of thus bringing about a more effective turnoff; they also serve to separate the circuits of the bistable multivibrator from the external control circuits. In the stable state (TR2 conductive) the capacitor C2 is charged at a voltage determined by a bridge R15–R16 and R17, right-hand electrode at the polarity +*e* through a diode D2, and the conductive transistor TR2. The capacitor C3 is not charged, its two electrodes being close to the potential +*e*, one through D2, TR2, diode D3 and resistor R18, and the other through R1.

When it is desired to bring about the unstable state by a polarity +*e* applied to E, the left-hand electrode of the capacitor C2 is brought to the potential +*e* through a diode D4 and the resistor R17; the current pulse emanating from capacitor C2 renders the transistor TR2 nonconductive. The consequent turnoff of the transistors TR3, TEC and TR4 enables the resistor R4 to supply a base current to the transistor TR1 through the Zener diode ZN2. The capacitor C3 is charged through D2 and TR1 on the one hand and through R18, R19 and R20 and on the other hand, TR1 becoming conductive and thus confirming the nonconductive state of TR2 produced by the capacitor C2.

If it is desired to interrupt the unstable period by a return to the stable state brought about by the wire RZ through a diode D5, the polarity +*e* applied to the latter acts on the capacitor C3, which was previously charged during the commencement of the unstable period in a manner similar to that described with reference to the action of the wire E1 on the capacitor C2, i.e. the discharge of the capacitor C3 immediately causes the transistor TR1 to become nonconductive.

Apart from those differences of FIG. 2 as compared with FIG. 1 whose object has just been indicated, there have been introduced into FIG. 2 a number of parts, diodes and resistors, acting in a conventional and known manner, in order to ensure the operation.

Of course, the invention is in no way limited to the embodiments described and illustrated, which have been referred to only by way of example. More particularly, it is possible without departing from the scope of the invention to make modifications of detail, to change certain arrangements or to replace certain means by equivalent means. Notably, the use of NPN-transistors instead of PNP-transistors or the use of different members having an equivalent function would be possible without departing from the scope of the present invention.

I claim:

1. Monostable device having a high time constant and a shortened time of reuse, with two states of operation including a stable state and an unstable state, comprising a bistable device having first and second inputs including first and second transistors forming a bistable multivibrator and a time-constant device including a capacitor and transistor combination having a high time constant connected between the base of said first transistors and the collector of the second transistor, the bistable device being controlled by the time-constant device so as to form a monostable device which is capable of being brought into the unstable state by a first control applied to said first input and returning to the stable state on expiration of its delay time, it being possible for the unstable state to be shortened as desired by a second control applied to said second input which returns the device to the stable state, said bistable device controlled by said time-constant device further including a Zener diode connected between the base of each of said first and second transistors and the collector of the other transistor, respectively, said transistor of the associated time-constant device being provided as a field effect transistor controlled by one input of said bistable device and acting after the time delay of said combination on an input of the bistable device to restore it to a stable state, and means for ending the unstable state before the time constant has elapsed in response to a control applied to the second input of the bistable device, wherein said time-constant circuit comprises a capacitor, a resistor and third, fourth and fifth transistors in series, the emitter of said third transistor being connected through a diode to a common point between one electrode of said capacitor and said resistor and the collector of said fifth transistor being connected to the base of said first transistor of the multivibrator through one of said Zener diodes, the other electrode of the capacitor being connected to the collector of the second transistor of the multivibrator, said first input being connected on the one hand to the base of said second transistor of the multivibrator and on the other hand through a Zener diode to the collector of the first transistor of the multivibrator, said second input for the premature return to the stable state being connected to the base of the first transistor of the multivibrator, the stable state of the multivibrator being defined by its first nonconductive transistor and its second conductive transistor and unstable state by the inverse arrangement, so that when the unstable state is produced by changeover of the multivibrator, the time-constant circuit is controlled for a time corresponding to the discharge of the capacitor into the resistor, whereby the common point is brought to a certain potential, and when the said potential is reached, the lapse of the time constant produces a further changeover of the multivibrator bringing it into the stable state, which latter changeover may also be produced by a special control for the return to the stable state.

2. Device according to claim 1, characterized in that said fourth transistor is said field-effect transistor, said third transistor having its base connected to a bias supply potential which is lower in absolute value than a normal supply potential, its collector being connected on the one hand to the normal supply potential through a resistor and on the other hand to the grid electrode of the field-effect transistor, the source electrode of the field-effect transistor being connected to the same potential as the base of third transistor, the drain electrode of the field-effect transistor being connected through a resistor to the base of said fifth transistor, the said base also being connected through a resistor to said normal supply potential, the emitter of the fifth transistor being connected to the supply potential and its collector being connected to a Zener diode, the second electrode of the capacitor also being connected on the one hand through a resistor to the same potential as the base of the third transistor and on the other hand to the collector of said second transistor of the multivibrator in such manner that, when the device is in the stable state, said third, fourth and fifth transistors being conductive, the capacitor is at a voltage lower than the supply voltage and that a supply voltage is applied by the collector of the fifth transistor having the effect of rendering nonconductive said first transistor of the multivibrator, while the device changes to the unstable state in response to a control signal applied to said first input and the capacitor creates at the common point a potential lower than that of the base of said third transistor, which has the effect of successively rendering nonconductive the third, fourth and fifth transistors, the unstable state lasting as long as the potential of the common point remains lower than that of the base of said third transistor, but the said potential increasing as the discharge of the capacitor proceeds, and then becoming sufficient to render said third transistor conductive again, said fourth and fifth transistors becoming conductive in turn and said fifth transistor then supplying a positive polarity which produces, through the Zener diode, the return to the stable state.

3. Device according to claim 2, characterized in that said resistor connected to said common point with the capacitor is of high value, the said resistor having one end connected to the supply potential and its other end connected to one electrode of the capacitor and to the anode of the connecting diode at the emitter of said third transistor of the time-constant circuit, but not supplying, during the stable state, a control current at the base of a transistor of the multivibrator as is the case in a conventional monostable multivibrator.

4. Device according to claim 3, characterized in that the capacitor of the time-constant device is charged with a partial charge in such manner as to reduce the reuse time of the device.

5. Device according to claim 4, characterized in that said means for ending the unstable state is connected on the one hand to the base of the first transistor of the multivibrator and on the other hand through a Zener diode connected to the collector of said fifth transistor of the time-constant circuit and to a resistor connected to supply potential.

6. Device according to claim 5, characterized in the provision of means for obtaining a lower bias of said field-effect transistor while retaining only a single supply voltage, and means for immediately rendering nonconductive the field-effect transistor.

7. Device according to claim 6, characterized in that the base of said third transistor is connected to a first branch consisting of two Zener diodes in series, a second branch consisting of a resistor and the supply voltage being applied between the free end of the resistor and the end of the Zener diode, a third circuit branch being connected to the other electrode of the capacitor through a resistor and a fourth circuit branch directly connecting the end of a bridge resistor and the source electrode of the field-effect transistor, the collector of said third transistor being connected on the one hand to the grid electrode of the field-effect transistor and on the other hand to a supply polarity through two resistors in series, the point common to these resistors in series also being connected to the other end of the bridge resistor, the drain electrode of the field-effect transistor being connected to the base of said fifth transistor through a resistor, the said base also being connected to a supply polarity through a resistor, the emitter of said fifth transistor being connected to a supply polarity and the collector being connected on the one hand to the base of the first transistor of the multivibrator through the Zener diode in such manner as to obtain a voltage at the base of said third transistor which is lower in absolute value than the voltage of the emitters, and said third, fourth and fifth transistors being conductive during the stable period and nonconductive during the unstable period, while the return to the stable state may take place without the control of the unstable state having disappeared.

8. Device according to claim 7, characterized in that the grid electrode of the field-effect transistor is connected through an accelerating capacitor to the collector of said second transistor of the multivibrator through a diode in such manner that, when the unstable state is brought about, the turnoff of the second transistor of the multivibrator results in the immediate turnoff of the field-effect transistor, said third transistor becoming conductive only slowly owing to its high-charging resistance at the collector, and the voltage at the grid of the field-effect transistor increasing sufficiently to cancel the current at the drain electrode.

9. A monostable device having a long time constant and a shortened time of reuse, with two states of operation including a stable state and an unstable state, comprising a bistable device having first and second inputs including first and second transistors, first and second Zener diodes connected between the base of one transistor and the collector of the other transistor of said bistable device, respectively, and a time-constant circuit connected between the collector of said second transistor and the base of said first transistor comprising in series, a capacitor, a field-effect transistor and a third transistor, said collector of said second transistor being connected to the grid of said field-effect transistor through said capacitor so as to be controlled by the output of the bistable device, said third transistor being responsive to said field-effect transistor for switching said bistable device to its stable state after a predetermined time delay, first means for applying a first control signal to said first input for switching said bistable device to its unstable state and second means for applying a second control signal to said second input for effecting a premature switching of said bistable device to its stable state.

* * * * *